United States Patent Office 3,732,285
Patented May 8, 1973

3,732,285
NOVEL AMINOBENZOPHENONE DERIVATIVES
Hisao Yamamoto, Nishinomiya, Shigeho Inaba, Takarazuka, Tadashi Okamoto, Toshiyuki Hirohashi, Ashiya, Kikuo Ishizumi, Ikeda, Michihiro Yamamoto, Toyonaka, Isamu Maruyama, Minoo, Kazuo Mori, Kobe, and Tsuyoshi Kobayashi, Minoo, Japan, assignors to Sumitomo Chemical Company, Limited, Osaka, Japan
No Drawing. Filed Mar. 22, 1971, Ser. No. 127,053
Claims priority, application Japan, Mar. 25, 1970, 45/25,546; Mar. 26, 1970, 45/25,674
Int. Cl. C07c 125/06
U.S. Cl. 260—471 C    1 Claim

ABSTRACT OF THE DISCLOSURE

Novel aminobenzophenone derivative represented by the Formula I,

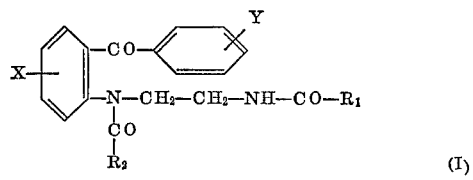

wherein $R_1$ signifies a hydrogen atom or an alkoxy group; $R_2$ signifies a hydrogen atom or $C_1$–$C_3$ alkyl group; X and Y each signify a hydrogen atom, a halogen atom, $C_1$–$C_3$ alkyl group, a trifluoromethyl group or a nitro group, is prepared by acylating an 1-(2-aminoethyl)-indole derivative represented by the Formula III with a formic acid derivative, then oxidizing the resulting 1-(N-acylaminoethyl)-indole derivative represented by the Formula II with an oxidizing agent by the following reaction schema:

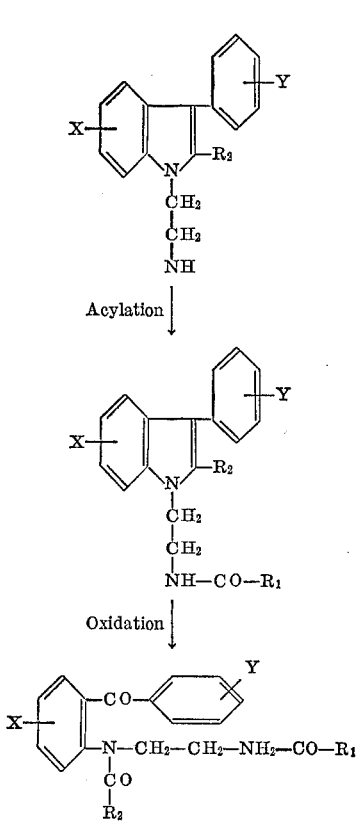

The aminobenzophenone derivatives of the Formula II have central nervous controlling effects and are useful intermediates for preparing benzodiazepine derivatives, which are known as remarkably effective tranquilizers, muscle relaxants, anticonvulsants and hypnotics.

The present invention relates to novel aminobenzophenone derivatives. More particularly, the invention pertains to novel aminobenzophenone derivative represented by the Formula I,

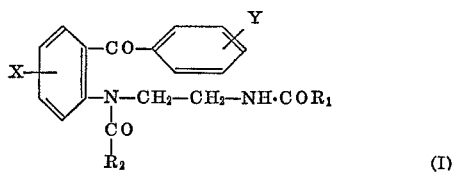

wherein X and Y each signify a hydrogen atom, a halogen atom, $C_1$–$C_3$ alkyl group, a trifluoromethyl group or a nitro group; $R_1$ signifies a hydrogen atom or an alkoxy group; $R_2$ signifies a hydrogen atom or $C_1$–$C_3$ alkyl group, and process for producing the same.

The aminobenzophenone derivatives represented by the Formula I are novel compounds and useful intermediates for preparing benzodiazepine derivatives.

According to the present invention, the benzophenone derivative represented by the Formula I can be prepared by oxidizing a 1-(N-acylaminoethyl)-indole derivative represented by the Formula II,

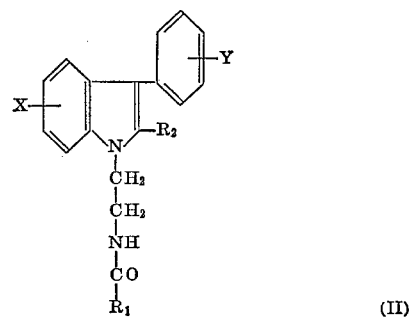

wherein $R_1$, $R_2$, X and Y have the same meanings as defined above, with an oxidizing agent.

The 1-(N-acylaminoethyl)-indole derivative represented by the Formula II can be prepared by acylating an 1-(2-aminoethyl)-indole derivative represented by the Formula III,

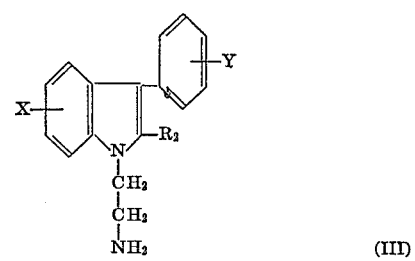

wherein $R_2$, X and Y have the same meanings as defined above, with a formic acid derivative.

All of these processes proceed smoothly and give the objective products in high yield and are very useful in practice.

These processes for producing benzophenone derivative of the Formula I may be thus represented by the following reaction schema:

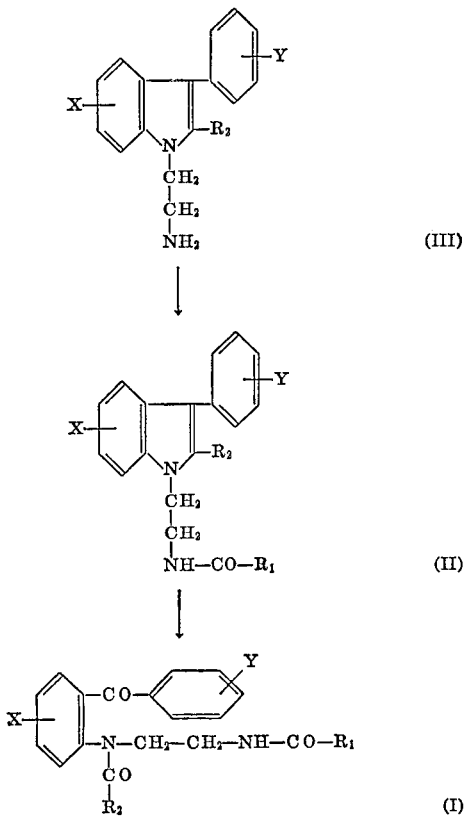

wherein $R_1$, $R_2$, X and Y are the same as defined above.

One object of the present invention is to provide novel aminobenzophenone derivatives represented by the Formula I.

Another object is to provide a process for producing the novel aminobenzophenone derivatives.

The aminobenzophenone derivatives represented by the Formula I prepared by the present invention, can easily be converted into the corresponding benzodiazepine derivatives (IV) by heating the former with a hydrolyzing agent in the presence of a suitable solvent, represented by the following reaction schema:

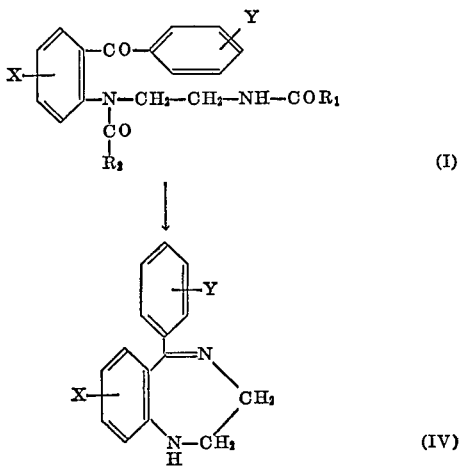

wherein $R_1$, $R_2$ X and Y are the same as defined above. The benzodiazepine derivatives of the Formula IV are known as remarkably effective tranquilizers, muscle relaxants, anticonvulsants and hypnotics.

The aminobenzophenone derivatives represented by the Formula I can be prepared by treating an 1-(N-acyl-aminoethyl)-indole derivative of the Formula II with at least stoichiometric amount of a suitable oxidizing agent.

The oxidizing agents used include, for example, ozone, performic acid, perbenzoic acid, chromic acid, permanganate, etc. but are not liimted to the named compounds. The reaction advantageously proceed in the presence of a solvent such as water, methanol, ethanol, acetic acid, propionic acid, dimethylsulfoxide, acetone, chloroform, dichloromethane and sulfuric acid or the like. The reaction may be carried out at room temperature. Higher or lower temperature is sometimes found more satisfactory.

By the process described above, the following compounds can, for example, be prepared:

$N^1$-formyl-$N^1$-(2-benzoylphenyl)-$N^2$-ethoxycarbonyl-ethylene diamine
$N^1$-formyl-$N^1$-(2-benzoyl-4-chlorophenyl)-$N^2$-methoxycarbonyl-ethylene diamine
$N^1$-formyl-$N^1$-(2-benzoyl-4-trifluoromethylphenyl)-$N^2$-methoxycarbonyl-ethylene diamine
$N^1$-formyl-$N^1$-(2-benzoyl-4-nitrophenyl)-$N^2$-ethoxycarbonyl-ethylene diamine
$N^1$-formyl-$N^1$-(2-benzoyl-4-methylphenyl)-$N^2$-ethoxycarbonyl-ethylene diamine
$N^1$-formyl-$N^1$-[2-(o-chlorobenzoyl)-4-chlorophenyl]-$N^2$-ethoxycarbonyl-ethylene diamine
$N^1$-formyl-$N^1$-[2-(o-fluorobenzoyl)-4-chlorophenyl]-$N^2$-ethoxycarbonyl-ethylene diamine
$N^1$-acetyl-$N^1$-(2-benzoyl-4-chlorophenyl)-$N^2$-ethoxycarbonyl-ethylene diamine
$N^1$-acetyl-$N^1$-[2-(o-fluorobenzoyl)-4-chlorophenyl]-$N^2$-ethoxycarbonyl-ethylene diamine
$N^1$-acetyl-$N^1$-(2-benzoyl-4-nitrophenyl)-$N^2$-ethoxycarbonyl-ethylene diamine
$N^1$-formyl-$N^1$-(2-benzoyl-4-chlorophenyl)-$N^2$-formyl-ethylene diamine
$N^1$-formyl-$N^1$-[2-(o-chlorobenzoyl)-4-chlorophenyl]-$N^2$-formyl-ethylene diamine
$N^1$-formyl-$N^1$-[2-(o-fluorobenzoyl)-4-chlorophenyl]-$N^2$-formyl-ethylene diamine
$N^1$-acetyl-$N^1$-(2-benzoyl-4-chlorophenyl)-$N^2$-formyl-ethylene diamine
$N^1$-acetyl-$N^1$-(2-benzoyl-4-nitrophenyl)-$N^2$-formyl-ethylene diamine The 1-(N-acylaminoethyl)-indole derivative represented by the Formula II can be obtained by acylating a 1-(2-aminoethyl)-indole derivative represented by the Formula III with a formic acid derivative. Examples of the formic acid derivative used formic acid, alkyl halogenocarbonates such as ethyl chlorocarbonate or methyl chlorocarbonate and the like. The reaction is carried out in the presence of a solvent such as benzene, toluene, ether, tetrahydrofuran, dioxane, chloroform, dichloromethane, pyridine, triethylamine, dimethylformamide or the like. When an alkyl halogenocarbonate is used, the reaction is preferably carried out in the presence of a base such as sodium hydroxide, potassium hydroxide, sodium bicarbonate, sodium carbonate, potassium carbonate, pyridine, triethylamine or the like. The reaction may be carried out at a temperature within the range from 0°–200° C.

By the process described above, the following compounds can, for example, be prepared.

1-methoxycarbonylaminoethyl-3-phenyl-5-chloroindole
1-ethoxycarbonylaminoethyl-3-phenylindole
1-ethoxycarbonylaminoethyl-3-phenyl-5-chloroindole
1-ethoxycarbonylaminoethyl-3-phenyl-5-methylindole
1-ethoxycarbonylaminoethyl-3-phenyl-5-trifluoromethylindole
1-ethoxycarbonylaminoethyl-3-(o-fluorophenyl)-5-chloroindole
1-ethoxycarbonylaminoethyl-3-phenyl-5-bromoindole
1-ethoxycarbonylaminoethyl-3-phenyl-5-nitroindole
1-ethoxycarbonylaminoethyl-3-(p-chlorophenyl)-5-chloroindole 1-ethoxycarbonylaminoethyl-2-methyl-3-phenylindole
1-ethoxycarbonylaminoethyl-2-methyl-3-phenyl-5-chloroindole
1-ethoxycarbonylaminoethyl-2-methyl-3-phenyl-5-bromoindole
1-ethoxycarbonylaminoethyl-2-methyl-3-(o-fluorophenyl)-5-chloroindole
1-ethoxycarbonylaminoethyl-2-methyl-3-(p-chlorophenyl)-5-chloroindole
1-ethoxycarbonylaminoethyl-2-methyl-3-phenyl-5-fluoroindole
1-ethoxycarbonylaminoethyl-3-phenyl-5-fluoroindole The compounds represented by the Formula III, which are the starting materials in the present invention, are prepared by reduction of the corresponding 1-cyanomethylindole derivatives.

The present invention will be illustrated in further details with reference to the following examples. It should be understood, however, that these examples are merely illustrative and the present invention is not restricted thereto.

EXAMPLE 1

To a mixture of 3.5 g. of 1-(2'-aminoethyl)-5-chloro-3-phenylindole hydrochloride, 3 g. of triethylamine and 50 ml. of tetrahydrofuran is added 1.6 g. of ethyl chloroformate at 10°–15° C. The mixture is stirred at 23° C. for one hour. After the reaction is completed, the solvent is removed under reduced pressure. Water is added to the residual oil and the mixture is extracted with ether. The ether layer is washed with water and dried over anhydrous sodium sulfate. Ether is removed to give 3.7 g. of an oil. The oil is crystallized from benzene-hexane (1:1) to give 3.2 g. of 1-(N-ethoxycarbonyl-2-aminoethyl)-5-chloro-3-phenyl-indole.

Recrystallization from benzene-hexane gives colorless needles, having a melting point of 114°–115° C.

EXAMPLE 2

An ozone-oxygen mixture containing about 2% of ozone is bubbled into a mixture of 3 g. of 1-(N-ethoxycarbonyl-2-aminoethyl)-5-chloro-3-phenyl-indole, 30 ml. of ethanol and 10 ml. of acetic acid at −5° C. until the reaction mixture becomes clear solution.

Water is added to the reaction mixture and the mixture is extracted with ether. The ether layer is washed with aqueous sodium carbonate and water, and dried over anhydrous sodium sulfate. Ether is removed to give 3.3 g. of a yellow solid.

Recrystallization from ethanol-water (7:3) gives $N^1$-formyl-$N^1$-(2-benzoyl-4-chlorophenyl) - $N^2$ - ethoxycarbonyl-ethylene diamine, having a melting point of 106°–108° C.

What is claimed is:

1. Novel aminobenzophenone derivative represented by the formula,

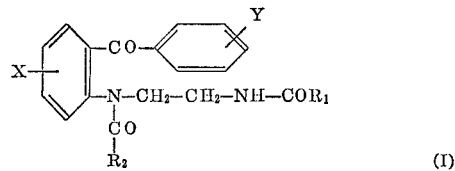

wherein $R_1$ signifies a hydrogen atom or a $C_1$–$C_3$-alkoxy group; $R_2$ signifies a hydrogen atom or a $C_1$–$C_3$ alkyl group; X and Y each signify a hydrogen atom, chlorine, bromine, fluorine, a $C_1$–$C_3$ alkyl group, a trifluoromethyl group or a nitro group.

References Cited

Karrer, Paul: Organic Chemistry (1950), Pub. by Elsevier Pub. Co., Inc., N.Y., pages 785–786 relied on.

LORRAINE A. WEINBERGER, Primary Examiner

L. A. THAXTON, Assistant Examiner

U.S. Cl. X.R.

260—326.13 R, 562 P